(12) United States Patent
Ko

(10) Patent No.: US 10,346,614 B1
(45) Date of Patent: Jul. 9, 2019

(54) SECURITY SYSTEM AND METHOD FOR INTERNET OF THINGS

(71) Applicant: Hajoon Ko, Cambridge, MA (US)

(72) Inventor: Hajoon Ko, Cambridge, MA (US)

( * ) Notice: Subject to any disclaimer, the term of this patent is extended or adjusted under 35 U.S.C. 154(b) by 0 days.

(21) Appl. No.: 16/290,425

(22) Filed: Mar. 1, 2019

(51) Int. Cl.
*G08B 23/00* (2006.01)
*G06F 21/57* (2013.01)
*H04L 29/06* (2006.01)
*H04L 9/06* (2006.01)

(52) U.S. Cl.
CPC .......... *G06F 21/575* (2013.01); *H04L 9/0643* (2013.01); *H04L 29/06755* (2013.01); *H04L 63/145* (2013.01); *H04L 65/1036* (2013.01)

(58) Field of Classification Search
CPC .... G06F 21/57; G06F 21/566; G06F 2221/03; G06F 2221/034; G06F 21/575; H04L 63/145
USPC .......................................................... 726/22
See application file for complete search history.

(56) References Cited

U.S. PATENT DOCUMENTS

| | | | | |
|---|---|---|---|---|
| 10,009,325 | B1 * | 6/2018 | David | H04L 12/40 |
| 10,205,712 | B2 * | 2/2019 | Smith | H04L 63/061 |
| 10,270,770 | B1 * | 4/2019 | Irwan | H04L 63/0876 |
| 2015/0033004 | A1 * | 1/2015 | Smeets | G06F 21/57 |
| | | | | 713/2 |
| 2015/0163229 | A1 * | 6/2015 | Lindteigen | H04L 63/1441 |
| | | | | 713/155 |
| 2015/0222596 | A1 * | 8/2015 | Byrkit | H04L 63/1416 |
| | | | | 726/12 |
| 2015/0229654 | A1 | 8/2015 | Perier | |
| 2015/0288659 | A1 * | 10/2015 | Lukacs | H04L 63/0227 |
| | | | | 713/2 |
| 2016/0014078 | A1 * | 1/2016 | Schrecker | H04L 63/0869 |
| | | | | 726/12 |
| 2016/0173495 | A1 | 6/2016 | Joo | |
| 2016/0248746 | A1 | 8/2016 | James | |
| 2017/0104580 | A1 * | 4/2017 | Wooten | G06F 8/65 |

(Continued)

OTHER PUBLICATIONS

Kaaniche et al, Efficiently Validating Aggregated IoT Data Integrity, IEEE, Mar. 29, 2018, pp. 260-265.*

(Continued)

*Primary Examiner* — Luu T Pham
*Assistant Examiner* — Jenise E Jackson
(74) *Attorney, Agent, or Firm* — Vincent G LoTempio; Kloss, Stenger & LoTempio; David T. Stephenson

(57) ABSTRACT

A security system and method for the Internet of Things integrates a multitude of devices and protocols. The security system includes an OAS security gateway that protects the local IoT devices from external network-based attacks through remote attestation requests to a remote attestation server. The remote attestation message is used by the remote attestation server to analyze the software execution history of the local IoT device, so as to detect malware or insecure software. A cryptographic chip operatively integrates in the security gateway. The security system also performs data packet encryption and decryption of communications between the local IoT devices and remote user devices with an encryption engine. A service virtualization engine converts incompatible communication protocols between the IoT device and the remote user device. A network traffic sanitization engine filters data packet communications between the local IoT device and the remote attestation server.

20 Claims, 5 Drawing Sheets

(56) References Cited

U.S. PATENT DOCUMENTS

| | | | |
|---|---|---|---|
| 2017/0289184 A1* | 10/2017 | C | H04L 63/1425 |
| 2018/0191719 A1 | 7/2018 | Tsao | |
| 2018/0196945 A1* | 7/2018 | Kornegay | G06F 21/85 |
| 2018/0373863 A1* | 12/2018 | Domke | G06F 21/44 |
| 2018/0373881 A1* | 12/2018 | Thom | G06F 21/602 |

OTHER PUBLICATIONS

Adkins et al, Demo Abstract: Michigan's IoT Toolkit, ACM, Nov. 4, 2015, pp. 485-486.*
Mandyam, Tiered Attestation for Internet-of-Things (IoT) Devices, IEEE, 2017, pp. 480-483.*

* cited by examiner

SECURITY SYSTEM AND METHOD FOR INTERNET OF THINGS

FIELD OF THE INVENTION

The present invention relates generally to a security system and method for the Internet of Things. More so, the present invention relates to an Internet of Things (IoT) that integrates a multitude of devices and protocols, and a security gateway that protects the local IoT devices from external network-based attacks through remote attestation requests to a remote attestation server to detect malware or insecure software, data packet encryption, and converting incompatible communication protocols between the IoT device and the remote user device.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, an Internet of Things (IoT) includes multiple devices and protocols that are in connection with the Internet. The IoT allows a user to remotely control home appliances while in an external environment. IoT is also used in buildings to quickly detect potential problems in buildings and inform building managers and firefighters in advance. IoT is also used in factories to coordinate machines more efficiently, to create real-time vehicle networks in smart cars and reduce traffic accidents, and to make city management easier. Internet of Things that is defined by a network of devices, vehicles, and home appliances that contain electronics, software, actuators, and connectivity. This connectivity allows the devices, vehicles, and home appliances to connect, interact and exchange data across the Internet.

It is known in the art will recognize that many IoT devices are impaired security-wise. By exploiting such weakness, attackers can get complete control of one's home appliances and play with them, which can lead to serious physical casualties. Further, as many IoT device hardware and software are heterogeneous, their communication protocols are incompatible with each other. This is a huge problem especially some IoT devices cannot change or update their software due to their hardware constraints or deprecation of support from the manufacturer.

The present invention attempts to use an OAS secure gateway IoT service virtualization engine to solve the security problems dynamically by converting incompatible communication protocols between IoT devices and remote user device, such as cell phones, laptops, cloud servers, or even other IoT devices, and making them fully compatible. By applying the appropriate IoT service virtualization engine, neither the local IoT device nor the remote endpoint needs to modify their original software to communicate with each other.

In many instances, the OAS gateway provides third party software developers with a service virtualization engine development template, with which they can implement new virtualization engines and install them on the OAS gateway. Such newly developed service virtualization engines can be signed by trusted software authorities and open-sourced.

Other proposals have involved security systems for Internet of Things. The problem with these security protocols is that they do not utilize remote attestation messages to review the software execution history of the local IoT devices before allowing internet connectivity. Also, the data packets are not encrypted. Even though the above cited security systems for Internet of Things meet some of the needs of the market, a security system and method for the Internet of Things that integrates a multitude of devices and protocols, and a security gateway that protects the local IoT devices from external network-based attacks through remote attestation requests to a remote attestation server to detect malware or insecure software, data packet encryption, and converting incompatible communication protocols between the IoT device and the remote user device is still desired.

SUMMARY

Illustrative embodiments of the disclosure are generally directed to a security system and method for the Internet of Things. The security system provides multiple security means for an Internet of Things (IoT) that integrates a multitude of devices and protocols. The security system utilizes a unique security gateway that protects the local IoT devices from external network-based attacks through remote attestation requests to a remote attestation server to detect malware or insecure software, data packet encryption, and converting incompatible communication protocols between the IoT device and the remote user device.

In some embodiments, the security method may include an initial Step of booting a local IoT device. The method may further comprise a Step of operatively connecting a security gateway between the local IoT device and a remote attestation server. A Step includes blocking, by the security gateway, communication between the local IoT device and a remote user device.

In some embodiments, a Step comprises transmitting, by the local IoT device, a remote attestation message. A Step includes transparently relaying, through the security gateway, the remote attestation message to the remote attestation server. In some embodiments, a Step may include analyzing a software execution history of the local IoT device to detect a malware and insecure software in the local IoT device.

A Step comprises whereby if malware and insecure software is detected, commanding, by the remote attestation server, the local IoT device to perform an operating software update or modify an execution order of the operating software. The method may further comprise a Step of notifying the security gateway that the local IoT device is free of the malware and insecure software.

A Step includes granting the local IoT device access to the remote user device through the Internet. Another Step comprises encrypting, through a traffic encryption engine, an outgoing data packet originating from the local IoT device to the remote user device. A Step includes decrypting, through the traffic encryption engine, an incoming data packet originating from the remote user device to the local IoT device. A final Step includes rebooting the local IoT device.

In another aspect, the method further comprises a step of transmitting, by the local IoT device, a subsequent remote attestation message to the remote attestation server.

In another aspect, the method further comprises a step of converting incompatible communication protocols between the IoT device and the remote user device through a service virtualization engine.

In another aspect, the security gateway comprises an OAS security gateway.

In another aspect, the security gateway comprises a Wi-Fi access point.

In another aspect, the remote attestation message transmitted by the local IoT device comprises an Internet Protocol address and a port number that is destined to the remote attestation server.

In another aspect, the command by the remote attestation server to the local IoT device to perform a software update or modify the execution order of certain software is relayed through the security gateway.

In another aspect, the subsequent remote attestation message is remotely transmitted to the remote attestation server.

In another aspect, the method further comprises a step of filtering, by the security gateway, the malware and insecure software.

In another aspect, the step of notifying, by the security gateway, comprises notifying a gateway administrator about the malware and insecure software.

In another aspect, the traffic encryption engine is operatively integrated in the security gateway.

In another aspect, the cryptographic chip is operatively integrated in the security gateway.

In another aspect, the traffic encryption engine and the service virtualization engine are signed by a software authority and open-sourced.

One objective of the present invention is to provide an OAS gateway protects local IoT devices connected to it from external network-based attacks.

Another objective is to allow users to remotely control home appliances while outside, and use IoT in buildings to quickly detect potential problems in buildings and inform building managers and firefighters in advance.

Yet another objective is to provide an OAS gateway that transparently supports without requiring any additional software installation or changes on neither the local IoT devices nor remote user devices.

In another example of an objective, a TPM cryptographic chip is used in the security gateway in order to review the software execution history of the local IoT device.

An exemplary objective is to prevent the local IoT device from accessing the Internet until it passes the authentication from the attestation server.

Additional objectives are to provide an inexpensive to operate security system and method for IoT devices.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
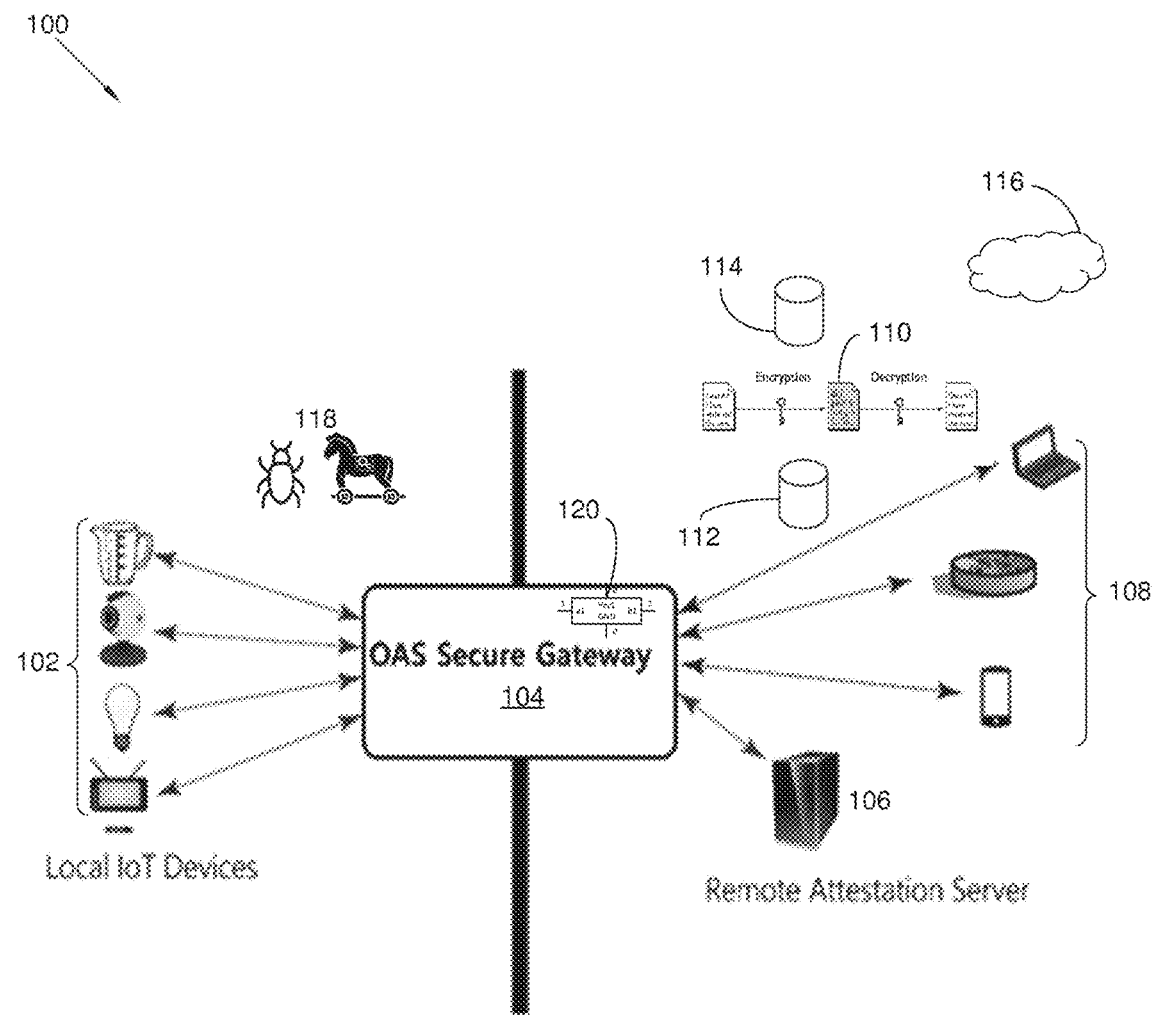
FIG. 1 illustrates a block diagram of an exemplary security system for the Internet of Things, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A security system 100 and method 400 for the Internet of Things is referenced in FIGS. 1-4B. The security system 100 provides security for a network of an Internet of Things (IoT). As FIG. 1 references, the security system 100 is adapt at protecting a network of devices, vehicles, and home appliances that interact and exchange data across the Internet 116. Specifically, the security system 100 protects at least one local IoT device 102 from external network-based attacks by transmitting remote attestation requests to and from a remote attestation server 106 to detect malware or insecure software 118. The security system 100 also encrypts and decrypts data packets flowing between the local IoT device 102 and the remote attestation server 106. Further, the security system 100 is unique in that it converts incompatible communication protocols between the IoT device and the remote user device.

As FIG. 1 references, the security system 100 is configured to provide security for an Internet of Things through use of remote attestation requests for the devices of the Internet of Things. A security gateway 104 operably positions between the local IoT device 102 and the remote attestation server 106. The security gateway 104 serves as a relay point, or a *nexus* between the local IoT device 102 and the remote attestation server 106; whereby the local IoT device 102 is restricted from connectivity with the Internet 116 until security protocol has been achieved.

Thus, the security gateway 104 is a general-purpose IoT security mechanism that can operate as a Wi-Fi AP providing Internet 116 access to local IoT devices 102. In one non-limiting embodiment, the security gateway 104 comprises an OAS security gateway 104. In another embodiment, the security gateway 104 comprises a Wi-Fi access point. In yet another non-limiting embodiment, security gateway 104 protects local IoT devices 102 connected to it from external network-based attacks. Security gateway 104 can be used in home, companies, and factories; it can also be manufactured as a smartphone-sized portable handheld device.

Figure 2:
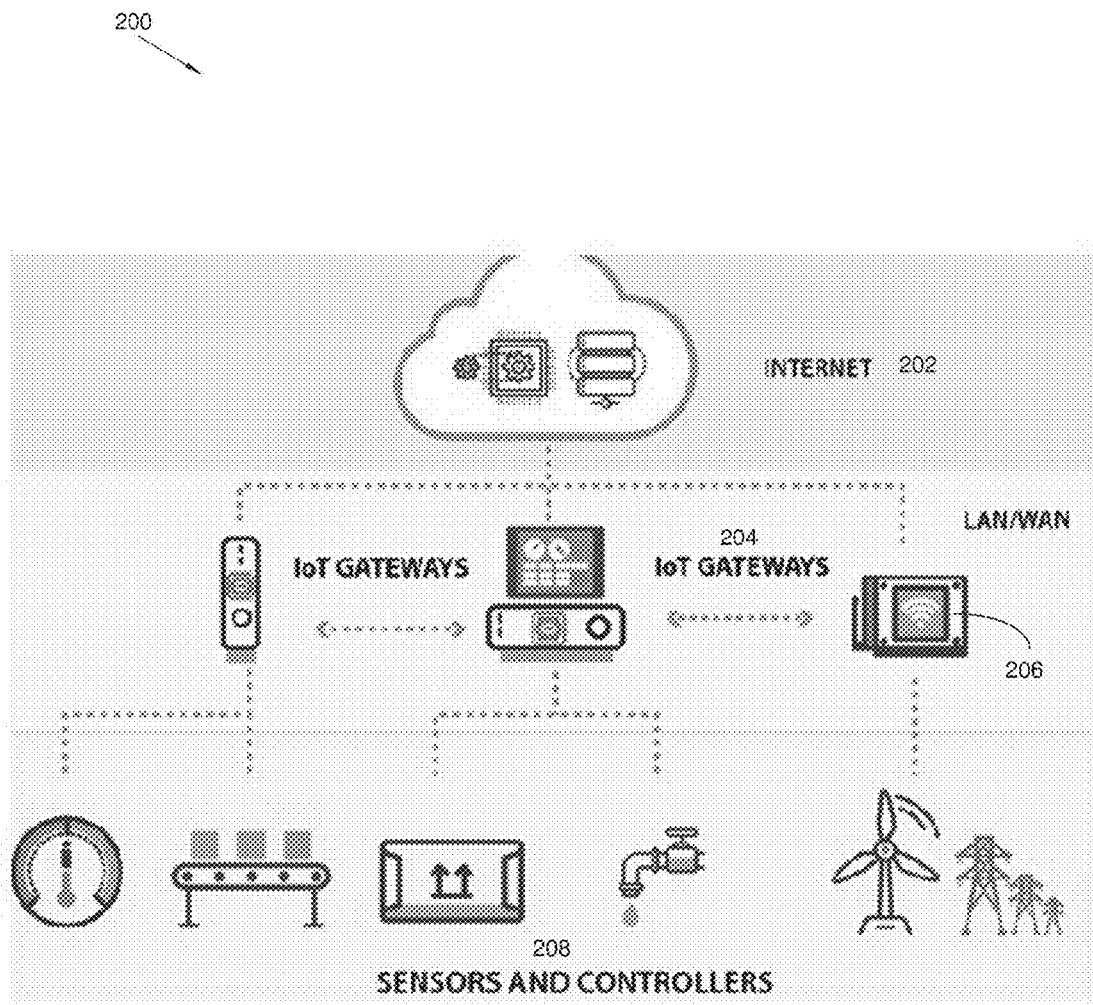
FIG. 2 illustrates a block diagram of an exemplary Internet of Things, in accordance with an embodiment of the present invention.

As FIG. 2 shows, an exemplary Internet of Things 200 that is defined by a network of devices, vehicles, and home appliances that contain electronics, software, actuators, and connectivity. This connectivity allows the devices, vehicles, and home appliances to connect, interact and exchange data across the Internet 202. FIG. 2 illustrates the Internet 202 to which IoT devices 206 operatively connect. To facilitate this connectivity, various standard gateways and networks 204, such as LAN and WAN, are used to enable this interconnectivity through Internet 202.

The command signals passing from IOT devices 206 through the Internet 200 are used to control various types of sensors and controllers 208. In some embodiments, sensors and controllers 208 may include, without limitation, a temperature gauge, a water valve, and a wind sensor and drivetrain. However, these Internet connections are remote and; thus, susceptible to malware and insecure software 118.

In another example of the Internet of Things 200, a user can remotely control home appliances while in an external environment. IoT is used in buildings to quickly detect potential problems in buildings and inform building managers and firefighters in advance. IoT is also used in factories to coordinate machines more efficiently, to create real-time vehicle networks in smart cars and reduce traffic accidents, and to make city management easier. Those skilled in the art will recognize that many IoT devices are impaired security-wise. By exploiting such weakness, attackers can get complete control of one's home appliances and play with them, which can lead to serious physical casualties.

Turning back to FIG. 1, security gateway 104 is operable to transparently relay a remote attestation message to the remote attestation server 106. In one embodiment, the remote attestation message transmitted by the local IoT device 102 includes an Internet Protocol address and a port number that is destined to the remote attestation server 106. A command by the remote attestation server 106 to the local IoT device 102 to perform a software update or modify the execution order of certain software is relayed through the security gateway 104.

Thus, in one exemplary remote attestation message, once a local IoT device 102 boots, the security gateway 104 transparently relays a cryptographic chip-based remote attestation communication between local IoT device 102 and remote attestation server 106. This allows security gateway 104 to analyze a software execution history of local IoT device 102, so as to detect a malware and insecure software 118 in local IoT device 102. If malware and insecure software 118 is detected, the remote attestation server 106 commands local IoT device 102 to perform an operating software update or modify an execution order of the operating software.

The security gateway 104 also grants local IoT device 102 full access to the internet only after the remote attestation server 106 notifies the gateway that IoT local device is not running any malware or insecure software 118. Thus, the security gateway 104 works to filter the malware and insecure software 118. After this cleanup, the remote attestation server 106 notifies the security gateway 104 that local IoT device 102 is free of the malware and insecure software. It is significant to note that security gateway 104 transparently supports the remote attestation without requiring any additional software installation or changes on either local IoT device 102 or the remote user devices 108.

In some embodiments, the security system 100 further comprises a traffic encryption engine 110 configured to encrypt an outgoing data packet originating from local IoT device 102 to remote user device. Conversely, traffic encryption engine 110 is also configured to decrypt an incoming data packet originating from the remote user device to local IoT device 102. The encryption and decryption functions are performed after the security protocol of the remote attestation message from the remote attestation server 106 is authenticated; and thereby local IoT device 102 is allowed to connect to the Internet.

Looking again at FIG. 1, the security system 100 also provides a service virtualization engine 112 that is configured to convert incompatible communication protocols between the IoT device and the remote user device. Service virtualization engine 112 dynamically converts incompatible communication protocols between the local IoT device 102 and the remote user devices 108, such as cell phones, laptops, or cloud servers that communicate with local IoT device 102. This allows the remote user devices 108 to be fully compatible. In one non-limiting embodiment, the traffic encryption engine 110 and the service virtualization engine are signed by a software authority and open-sourced.

Further, security system 100 includes a network traffic sanitization engine 114 that is configured to filter the data packets to and from the local IoT device 102. Security gateway 104 monitors all unencrypted communication packets between each pair of a local IoT device 102 and a remote endpoint in real-time. Thus, when any malicious data infiltration or leakage of sensitive data to the external network is detected, the security gateway 104 filters them out and notify this to the gateway's administrator. Security gateway 104's monitoring and filtering policies can be either directly configured by the gateway administrator, or can be downloaded from a trusted security authority with its signature. The security gateway 104 can determine which policy to apply to which traffic flow based on the source and destination IP addresses and port numbers of each traffic flow.

Figure 4A:
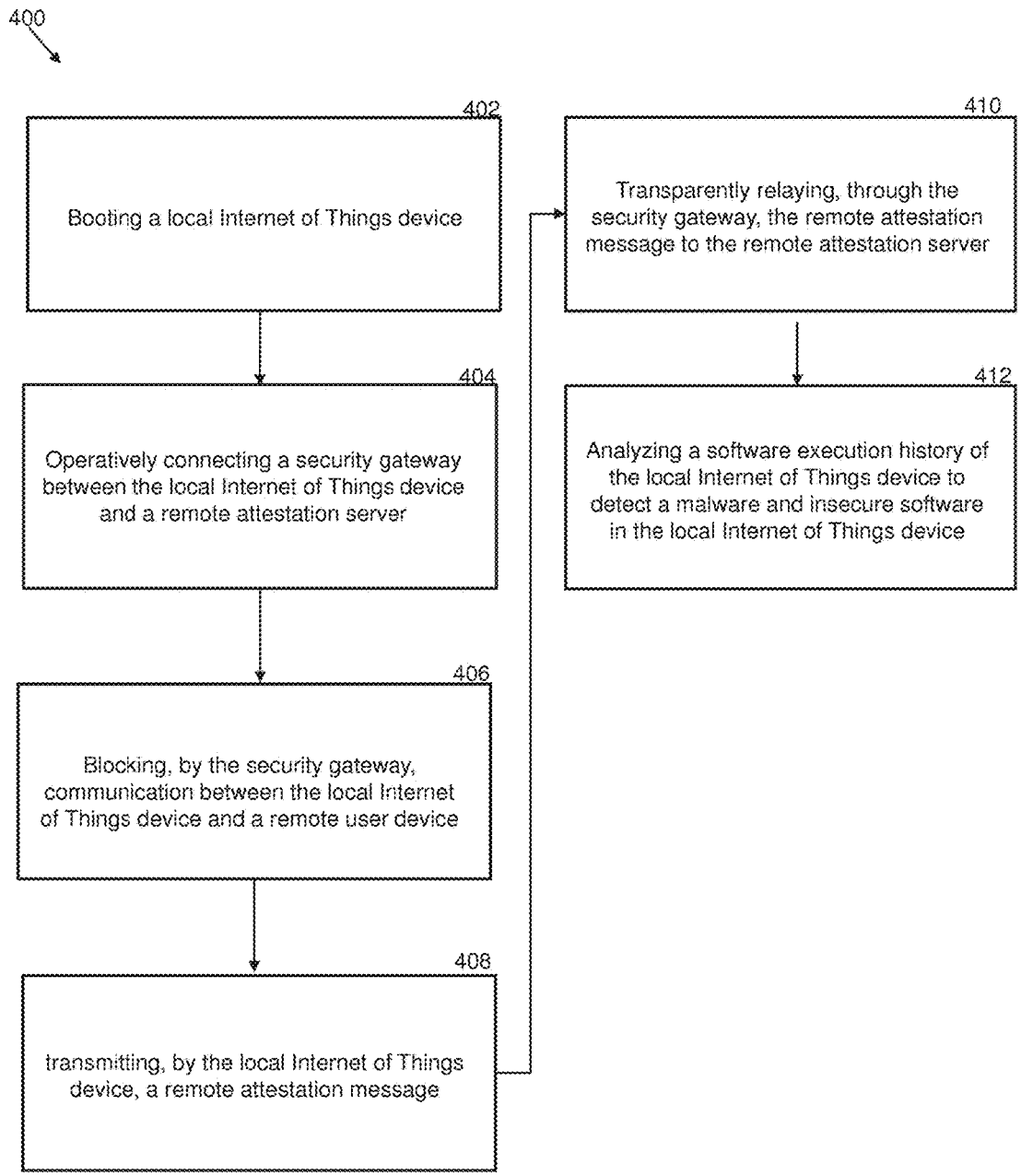
FIGS. 4A and 4B illustrate a flowchart of an exemplary security method for an Internet of Things, in accordance with an embodiment of the present invention.
Figure 4B:
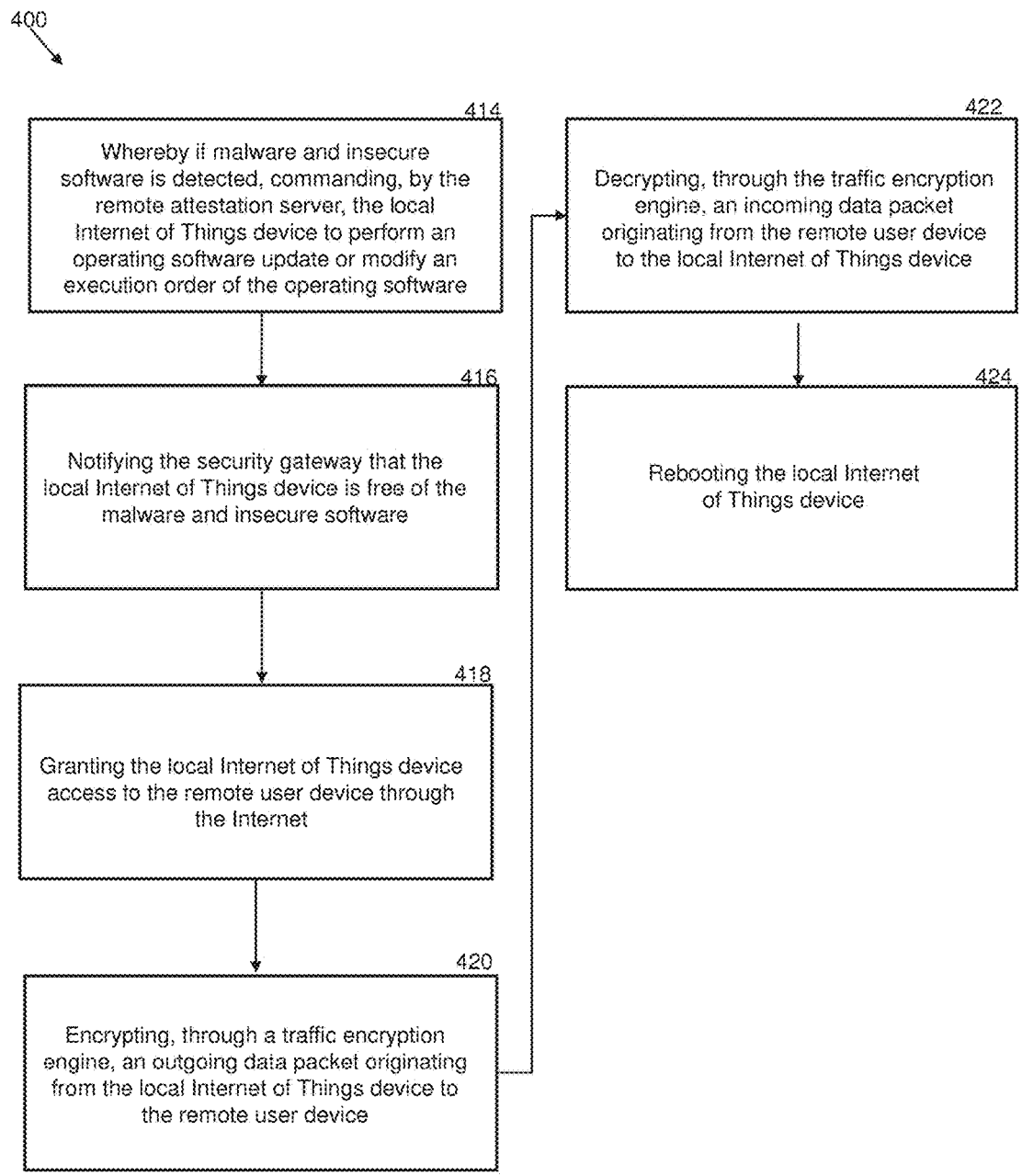

FIGS. 4A and 4B illustrate a flowchart diagram of an exemplary security method 400 for an Internet of Things. Method 400 may include an initial Step 402 of booting a local IoT device. Local IoT device may include, without limitation, a network of devices, vehicles, and home appliances that interact and exchange data across the Internet. Method 400 may further comprise a Step 404 of operatively connecting a security gateway between the local IoT device and a remote attestation server.

In one non-limiting embodiment, the security gateway used in method 400 comprises an OAS security gateway. In another non-limiting embodiment, security gateway is an OAS IoT security gateway that serves as a local access point such as router, IoT hub, or hotspot. OAS security gateway works to transparently relay the local IoT device's remote attestation to the remote authentication server and does not give a local IoT device connection to the Internet until the authentication server approves the local IoT device's software execution history and communicates this to the security gateway.

In yet another embodiment, security gateway comprises a Wi-Fi access point. In yet another non-limiting embodiment, security gateway protects local IoT devices connected to it from external network-based attacks. Further, a TPM cryptographic chip 120 is operatively integrated into security gateway. TPM cryptographic chip 120 is used for the remote attestation function of the secure gateway. In one non-limiting embodiment, TPM chip internally has 24 PCR registers, each storing 20 bytes or 32 bytes of data, and a private encryption key never disclosed to the outside world.

Consequently, local IoT device is safe from network attacks until it passes the authentication from the attestation server, because it doesn't get connected to the Internet until then. Therefore, malicious software cannot infiltrate into the IoT device; even if it is already somehow ended up running on the local IoT device, it cannot leak the device's sensitive data to the external network over the Internet.

In some embodiments, a Step 406 includes blocking, by the security gateway, communication between the local IoT device and a remote user device. This restriction prevents the malware and suspicious software 118 from contaminating the local IoT device. Continuing, a Step 408 comprises transmitting, by the local IoT device, a remote attestation message. The attestation message is transported remotely for the purpose of analyzing the software execution history of the local IoT device.

Figure 3:
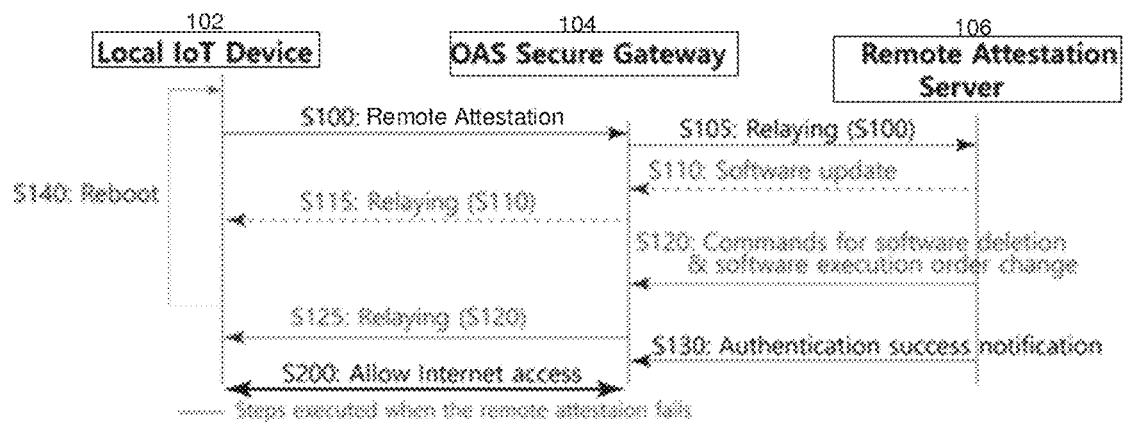
FIG. 3 illustrates a chart of an unmodified remote attestation protocol between local IoT device and remote attestation server transparently relayed by the security gateway, in accordance with an embodiment of the present invention.

FIG. 3 references an unmodified remote attestation protocol between local IoT device and remote attestation server transparently relayed by the security gateway. This is, in essence, how security gateway transparently relays the unmodified remote attestation communication between the local IoT device and the remote attestation server. Thus, when the local IoT device boots, the security gateway allows it internet access only to remote attestation server.

At this point, local IoT device sends a remote attestation message whose IP address and port number is destined to the remote attestation server's (S100). Security gateway relays this message to the attestation server (S105), who in turn analyzes the software execution history log file of the local IoT device. Upon successful authentication, the remote attestation server notifies the security gateway of an authentication success message (S130), and security gateway subsequently allows the local IoT device full internet access (S200). On the other hand, if the authentication fails, the remote attestation server analyzes the cause of the authentication failure of the local device.

If updates of specific software is necessary, remote attestation server sends those updates to the local IoT device (S110), which is relayed by security gateway (S115). If certain untrusted software requires deletion, or certain software execution orders need to be changed, the remote attestation server sends an appropriate instruction message to the local IoT device (S120), which is relayed by security gateway (S125). When all the measures are taken, the local IoT device reboots (S140) and remotely attests again to the remote attestation server (S100).

It is significant to note that the remote attestation protocol shown in FIG. 3 occurs when the local IoT device initially boots up. Optionally, the security gateway may require local IoT device to remotely re-attest periodically while it is connected to the external network, so that the local IoT device's software execution history can be continuously re-attested.

Continuing with method 400, a Step 410 includes transparently relaying, through the security gateway, the remote attestation message to the remote attestation server. Those skilled in the art will recognize that remote attestation is a security technique for remotely checking the software execution history of a remote device. A software execution history is essentially a chronological order of all software that a device has executed since its boot.

For purposes of the present invention, remote attestation uses a TPM, a cryptographic chip. The security gateway uses remote attestation to automatically update old software of local IoT devices and determine whether any malware is running and whether the device's software has been executed in a secure order. However, the conventional remote attestation architecture is insecure where a local IoT device to remotely attest to a physically remote authentication server, because the local IoT device must first be connected to the Internet before remotely attesting in this case.

Therefore, if the local IoT device runs a compromised attacker-controlled software before its remote attestation program executes, the attacker-controlled software transmits the device's sensitive data over the Internet before the device's remote attestation procedure takes place. Or, the attacker-controlled software may event prevent the device's remote attestation program from running. In this case remote attestation will not happen at all, while the local IoT device is already connected to the Internet and gives the attacker-controlled software access to the Internet to launch subsequent network-based attacks.

In some embodiments, a Step 412 may include analyzing a software execution history of the local IoT device to detect a malware and insecure software in the local IoT device. Continuing, a Step 414 comprises whereby if malware and insecure software is detected, commanding, by the remote attestation server, the local IoT device to perform an operating software update or modify an execution order of the operating software.

Method 400 may further comprise a Step 416 of notifying the security gateway that the local IoT device is free of the malware and insecure software. The step of notifying, by the security gateway, comprises notifying a gateway administrator about the malware and insecure software 118. A Step 418 includes granting the local IoT device access to the remote user device through the Internet. At this point, local IoT device is operable with remote user devices 108.

In one non-limiting embodiment of method 400, a further Step 420 comprises encrypting, through a traffic encryption engine, an outgoing data packet originating from the local IoT device to the remote user device. Conversely, a Step 422 includes decrypting, through the traffic encryption engine, an incoming data packet originating from the remote user device to the local IoT device.

A final Step 424 of method 400 includes rebooting the local IoT device. A subsequent remote attestation message is then remotely transmitted to the remote attestation server to repeat the security steps discussed above. In this manner, security gateway can encrypt each unencrypted traffic flow originated from the local IoT device in order to prevent external attackers from peeking or tampering with IoT traffic.

Such an intermediate traffic encryption is particularly useful when the local IoT device doesn't support data encryption due to its lack of encryption software or the limitation of its hardware resource. In another embodiment, method 400 further comprises a step of transmitting, by the local IoT device, a subsequent remote attestation message to the remote attestation server. The aforementioned steps are then repeated.

It is significant to note that traffic encryption engine is useful in such cases because this approach does not require modifying any of the hardware and software of local IoT device. In particular, the security gateway encrypts packets originated from local IoT device before sending them out to the external network, and decrypts incoming packets before forwarding them to local IoT device. For this mechanism to work, the remote endpoint should support an encrypted protocol. The encryption scheme to apply to a traffic flow can be configured directly by the gateway's administrator based on each traffic flow's source and destination IP addresses and port numbers.

Further, the OAS gateway's list of supported each encryption engines, e.g., TLS, DTLS, can be downloaded from a trusted security authority with its signature. In one non-limiting embodiment, method 400 further comprises a step of converting incompatible communication protocols between the IoT device and the remote user device through a service virtualization engine.

In conclusion, once local IoT device boots, the security gateway grants local IoT device restricted Internet connection only to remote attestation server. Security gateway grants local IoT device full access to the Internet and can communicate with remote user devices only after it remotely attests to the remote attestation server via security gateway and authenticates its software execution history. Upon failing the authentication procedure, the remote attestation server may instruct local IoT device to perform software update, prevent certain potentially malicious programs from executing, and modify the execution order of certain software.

After updating the software, and thereby preventing certain programs from executing or modifying software execution orders as instructed by the remote attestation server, the local IoT device reboots and remotely re-attest to the remote attestation server. The role of the security gateway during the remote attestation is only to transparently relay the communication between the local IoT device and the remote attestation server, while blocking local IoT device's Internet connectivity to any other remote user devices than the remote attestation server. It is significant to note that the security gateway does not require the IoT device to modify its original remote attestation program.

Finally, a few notes about the security system 100 and method 400 address the TPM cryptographic chip 120. The TPM cryptographic chip is used for the remote attestation function of the secure gateway. In one non-limiting embodiment, TPM chip internally has 24 PCR registers, each storing 20 bytes or 32 bytes of data, and a private encryption key never disclosed to the outside world. This private cryptographic key is a secret value of the TPM itself, which never gets leaked out of the TPM at any time.

TPM provides three major functionalities based on the I/O interface: read, extend, and quote respectively. Read function returns the current value of the selected PCR register. Extend function concatenates the new input value to the current value of the selected PCR register selected, crypographically hashes the value (SHA1), and overwrites the result into the same PCR register. For example, if specific input values are sequentially extended to the same PCR register, the value of the PCR register represents a cumulative summary value of all input values previously extended. Extend function is used at remote attestation to represent a cumulative summary value of softwares chronologically executed after a device is booted.

Quote function uses the TPM chip's private encryption key to sign and return the current value of the PCR register selected by the user. This signed value is called a quote. Quote function takes a random value (i.e., nonce) as a user input. Varying this nonce makes the returned quote to be different for every quote request, even if the selected PCR's current value is the same as before. The purpose of using a nonce is to prevent a malicious software infiltrated into the device from launching a replay attack of reusing the previously used valid quote to remotely attest to the OAS gateway.

As discussed above, FIG. 3 presents an example of a runtime software stack (software execution history). This is a runtime software stack that represents software chronologically executed after a local IoT device boots. The device has sequentially executed CRTM, BIOS, bootloader, OS kernel, kernel modules, system processes, and finally application processes. Before each program executes, its binary value is extended to the designated PCR register of the TPM. The designated PCR register of TPM holds a value that represents the complete summary of all software executed sequentially on the device since the device booted.

Application processes;
Kernel modules/System processes;
Kernel image;
Kernel bootloader;
Read/write firmware (BIOS); and
Read-only firmware (CRTM).

In analysis of runtime software stacks, when the local IoT device sends its software stack log file to the OAS gateway, the gateway uses its own template for determining the security of the given runtime software stack. This template classifies each executable file comprising the runtime software stack into one of five sets. The first set is a mandatory set: a collection of software that must be executed on a device. For example, this may be some core start-up programs for the local IoT device.

The second set is a priority set that must be executed before other programs or scripts: some security software may have to run before other untrusted programs. The third set is a blacklisted set, which is known malicious programs that should not ever run on the device. The fourth set is a deprecated set that houses obsolete software which need to be updated, for example, an older version of OpenSSL library vulnerable to Heartbleed attacks. The last set is a miscellaneous set, which includes other unknown or untrusted software that do not belong to the previous four sets. For the miscellaneous set, one of two policies can be enforced. The first is a strict policy, which prevents a local IoT device from executing any program belonging to the miscellaneous set.

This policy is secure and conservative because it allows the local IoT device to execute only good known programs. However, the strict policy's disadvantage is that even those programs that are unknown but not necessarily malicious are not allowed to execute on the local IoT device. The second policy to compensate for this problem is a flexible policy that allows a local IoT device to execute all unknown or untrusted programs (excluding those belonging to the malicious set).

Instead, the OAS gateway imports an advanced runtime software stack log analyzer engine, which analyzes the runtime software stack in a more complex and professional manner. The information about which of the five sets each given program, such as a file, belongs to can be either directly configured by the administrator of the OAS gateway, or an external trusted security authority can provide this classification with its signature.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A computer implemented security method for an Internet of Things, the method comprising:
    booting a local Internet of Things device;
    operatively connecting a security gateway between e local Internet of Things device and a remote attestation server;
    granting the local IoT device restricted Internet connection only to the remote attestation server;
    blocking, by the security gateway, the local IoT device Internet connectivity to a remote user device;
    transmitting, by the local Internet of Things device, a remote attestation message;
    transparently relaying, through the security gateway, the remote attestation message to the remote attestation server;
    analyzing a software execution history of the local Internet of Things device to detect a malware and insecure software in the local Internet of Things device;
    whereby if the malware and insecure software is detected, commanding, by the remote attestation server, the local Internet of Things device to perform an operating software update or modify an execution order of the operating software;
    notifying the security gateway that the local Internet of Things device is free of the malware and insecure software;
    granting the local Internet of Things device full access to the Internet with the remote user device after the remote attestation server notifies the security gateway that the IoT local device is free of malware and insecure software;
    encrypting, through a traffic encryption engine, an outgoing data packet originating from the local Internet of Things device to the remote user device;
    decrypting, through the traffic encryption engine, an incoming data packet originating from the remote user device to the local Internet of Things device; and
    rebooting the local Internet of Things device, and maintaining full access to the Internet with the remote user device.

2. The method of claim 1, further comprising a step of converting incompatible communication protocols between the Internet of Things device and the remote user device through a service virtualization engine.

3. The method of claim 1, further comprising a step of filtering a data packet between the local IoT device and the remote attestation server with a network traffic sanitization engine.

4. The method of claim 1, wherein the security gateway comprises an Open Application Programming Interface Specification (Oas) security gateway.

5. The method of claim 1, wherein the security gateway comprises a Wi-Fi access point.

6. The method of claim 1, wherein the remote attestation message transmitted by the local Internet of Things device comprises an Internet Protocol address and a port number that is destined to the remote attestation server.

7. The method of claim 1, wherein the step of commanding by the remote attestation server to the local Internet of Things device to perform a software update or modify the execution order of certain software, is relayed through the security gateway.

8. The method of claim 1, wherein the subsequent remote attestation message is remotely transmitted to the remote attestation server.

9. The method of claim 1, further comprising a step of filtering, by the security gateway, the malware and insecure software.

10. The method of claim 1, wherein the step of notifying the security gateway that the local Internet of Things device, further comprises notifying the gateway administrator about the malware and insecure software.

11. The method of claim 1, wherein the traffic encryption engine is operatively integrated in the security gateway.

12. The method of claim 1, wherein a cryptographic chip is operatively integrated in the security gateway.

13. The method of claim 1, wherein the traffic encryption engine and the service virtualization engine are signed by a software authority and open-sourced.

14. A computer implemented security method for an Internet of Things, the method comprising:
    booting a local Internet of Things (IoT) device;
    operatively connecting a security gateway between the local Internet of Things device and a remote attestation server, a cryptographic chip being operatively integrated in the security gateway;
    granting the local IoT device restricted Internet connection only to the remote attestation server;
    blocking, by the security gateway, the local IoT device Internet connectivity to a remote user device;
    transmitting, by the local Internet of Things device, a remote attestation message;
    transparently relaying, through the security gateway, the remote attestation message to the remote attestation server;
    analyzing a software execution history of the local Internet of Things device to detect a malware and insecure software in the local Internet of Things device;
        whereby if the malware and insecure software is detected, commanding, by the remote attestation server, the local Internet of Things device to perform an operating software update or modify an execution order of the operating software;
    notifying the security gateway that the local Internet of Things device is free of the malware and insecure software;
    granting the local Internet of Things device full access to the Internet with the remote user device after the remote attestation server notifies the security gateway that the IoT local device is free of malware and insecure software;
    encrypting, through a traffic encryption engine, an outgoing data packet originating from the local Internet of Things device to the remote user device;

decrypting, through the traffic encryption engine, an incoming data packet originating from the remote user device to the local Internet of Things device;

converting incompatible communication protocols between the Internet of Things device and the remote user device through a service virtualization engine;

filtering a data packet between: the local IoT device and the remote attestation server with a network traffic sanitization engine;

rebooting the local Internet of Things device, and maintaining full access to the Internet with the remote user device; and transmitting, by the local Internet of Things device, a subsequent remote attestation message to the remote attestation server.

15. The method of claim 14, wherein the security gateway comprises an Open Application Programming Interface Specification (Oas) security gateway.

16. The method of claim 14, wherein the security gateway comprises a Wi-Fi access point.

17. The method of claim 14, wherein the remote attestation message transmitted by the local Internet of Things device comprises an Internet Protocol address and a port number that is destined to the remote attestation server.

18. The method of claim 14, wherein the step of commanding by the remote attestation server to the local Internet of Things device to perform a software update or modify the execution order of certain software, is relayed through the security gateway.

19. The method of claim 14, wherein the traffic encryption engine and the service virtualization engine are signed by a software authority and open-sourced.

20. A computer implemented security system for an Internet of Things, the system comprising:

at least one local Internet of Things (IoT) device;

a remote attestation server;

a security gateway operatively connected between the local Internet of Things device and the remote attestation server, the security gateway configured to grant the local IoT device restricted Internet connection only to the remote attestation server;

the security gateway configured to selectively block the local MT device Internet connectivity to a remote device;

a cryptographic chip operatively integrated in the security gateway;

the local Internet of Things device configured to transmits remote attestation message;

the security gateway configured to transparently relays the remote attestation message to the remote attestation server;

whereby if the malware and insecure software is detected, commanding, by the remote attestation server, the local Internet of Things device to perform an operating software update or modify an execution order of the operating software;

the remote attestation server configured to notify the security gateway that the local Internet of Things device is free of the malware and insecure software;

the security gateway configured to grant the local Internet of Things device full access to the Internet with the remote user device after the remote attestation server notifies the security gateway that the IoT local device is free of malware and insecure software;

a traffic encryption engine configured to encrypt an outgoing data packet originating from the local Internet of Things device to the remote user device, the traffic encryption engine decrypting an incoming data packet originating from the remote user device to the local Internet of Things device;

a service virtualization engine configured to convert incompatible communication protocols between the Internet of Things device and the remote user device; and a network traffic sanitization engine configured to fillet a data packet between the local IoT device and the remote attestation server;

and the local IoT device configured to reboot and maintaining full Internet access with the remote user device.

* * * * *